Feb. 13, 1968 C. S. SCHEFFLER 3,368,271
METHOD OF MAKING A TWO-PIECE BILLIARD CUE
Filed Aug. 18, 1965
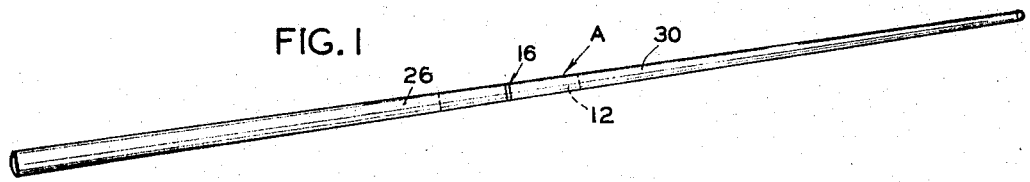
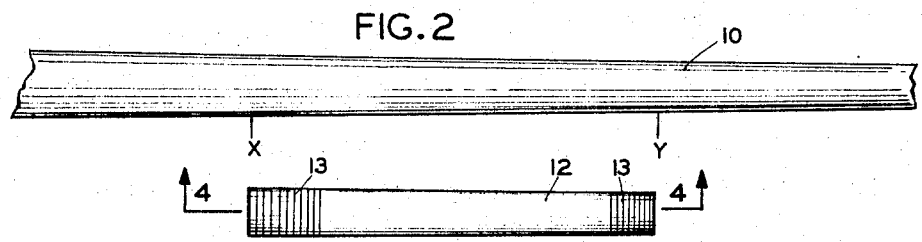
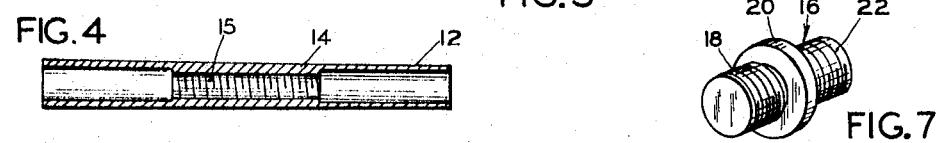 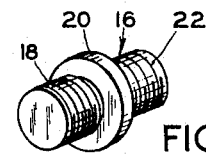
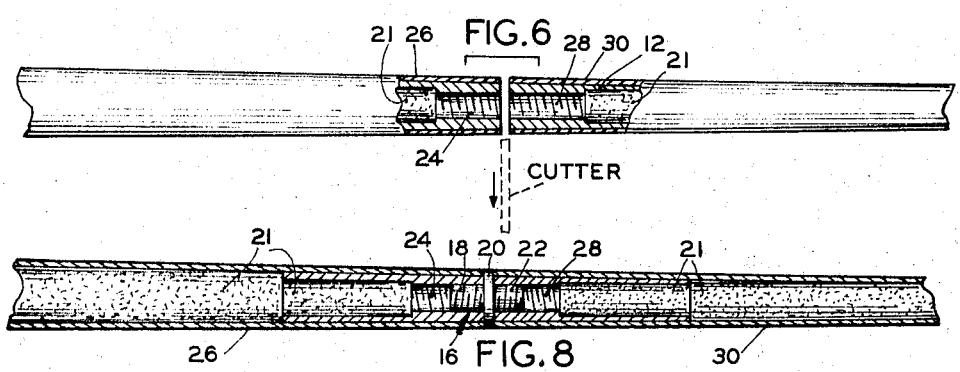
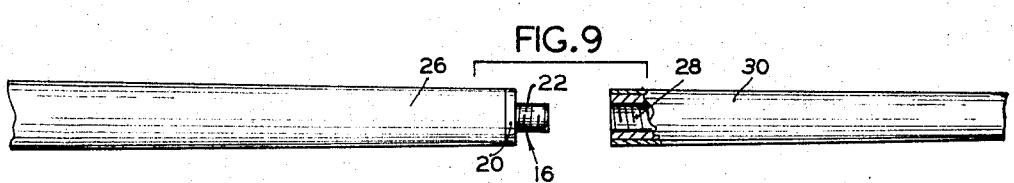
INVENTOR.
CLIFFORD S. SCHEFFLER
BY
Caswell, Lagaard & Wicks
ATTORNEYS 3,368,271
METHOD OF MAKING A TWO-PIECE BILLIARD CUE
Clifford S. Scheffler, Park Falls, Wis., assignor to St. Croix Corporation, Park Falls, Wis.
Filed Aug. 18, 1965, Ser. No. 480,647
2 Claims. (Cl. 29—411)

ABSTRACT OF THE DISCLOSURE

The disclosure relates to a method for making a two-piece billiard cue and includes the forming of a tubular body, then forming a bushing having threads formed internally thereof, then securing the bushing within the tubular body, then simultaneously cutting the tubular body and bushing substantially centrally thereof to form upper and lower half tubular portions, then forming a connector member having upper and lower threaded end portions with a circular flange therebetween, then then threadedly engaging the lower threaded end of the connector member permanently in the lower half tubular portion with the upper threaded end of the connector threadedly connected in the upper tubular half portion, the inner ends of the tubular portions in abutment with the circular flange.

---

The invention relates broadly to billiard cues and more particularly to a billard cue formed of two joined and removably connected half portions whereby the same may be separated for easy compact carrying and easily joined for use It is an object of the invention to provide a two piece billiard cue and the method of making the same with which the cue body has a separable joint substantially centrally thereof. It is a further object to provide a method of making a two-piece cue having two separable half portions with a joint which provides perfect axial alignment of the half portions when secured together.

It is an additional object to provide a method of making a two-piece cue having a joint which is strong enough to withstand excessive abuse and which lends itself to mass production. It is a still further object to provide a two-piece cue having a joint which is economical to manufacture, which has parts compatible with each other, and which is within weight limits which are critical in billard cues.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application,

FIGURE 1 is a perspective view of a completed billiard cue employing the invention.

FIGURE 2 is a perspective view of a portion of the tubular body from which the two-piece cue is constructed.

FIGURE 3 is a side elevational view of the bushing member removed from the cue body and prior to cutting.

FIGURE 4 is a longitudinal sectional view on the line 4—4 of FIGURE 3.

FIGURE 5 is a longitudinal sectional view through a central portion of the cue body with the bushing in place therein and shown in full line.

FIGURE 6 is a longitudinal elevational view of a portion of the completed cue with the half portions shown as separated and after cutting but without the connector member, some portions being in section.

FIGURE 7 is a perspective view of the connector member removed from the cue.

FIGURE 8 is a longitudinal sectional view of a central portion of the cue in a completed connected condition.

FIGURE 9 is a side elevational view of the cue in a separated condition, a portion of one half of the cue being in section.

Referring to the drawings in detail, the billiard cue A includes in the formation thereof the elongated rigid tubular body member 10 which has a thin constant wall thickness and a constant taper substantially from one end to the other. The body 10 may be made of fiber glass or similar material thereby reducing the warpage of the cue to a minimum. Further provided is the elongated tubular bushing member 12 which has a constant outer taper which is the same taper and diameters as the inner taper and diameters of the tubular body 10 substantially centrally of the body 10. The bushing 12 is preferably formed of aluminum and has formed centrally and internally thereof the thickened portion 14 which is drilled and tapped as at 15. The outer surface of the bushing 12 is formed with the circular grooves 13 for the receipt of adhesive.

The numeral 16 designates a connector member which is formed preferably of brass with the lower threaded end portion 18, the centrally disposed circular flange 20 and the upper threaded end portion 22. The diameter of the flange 20 is substantially that of the central diameter of the body 10 at the point where the flange 20 is positioned. The aluminum bushing and the brass connector are compatible one with the other and both are compatible with the fiber glass body 10.

In the further formation of the cue the bushing 12 is coated with an adhesive and dropped into the larger end of the body 10 and the bushing jams and positions in the body 10, for the taper and the diameters thereof are the same as the inside of the body 10 substantially centrally thereof indicated substantially as between $x$ and $y$ in FIGURE 2. As a result the bushing and body 10 are precisely concentric.

In this stage of construction the cue apepars as in FIGURE 5. The cue body 10 is then filled with a plastic foam 21. The body 10 with the bushing in place, as described, is then cut centrally with respect to the bushing 12 by means of a precision rotational cutter, the cutting of the body 10 and the bushing accomplished with a single cut precisely normal to the longitudinal axis of the body 10 and the bushing 12 as illustrated particularly in FIGURE 6. Such a cutting results in a threaded female portion 24 in a lower cue body half portion 26 and a threaded female portion 28 in the upper cue body half portion 30. The bushing 12 extends beyond the threaded portion at each end to give stability of the bushing portions 24 and 38 within the body portions 26 and 30, respectively.

The threaded end 18 of the connector 16 is coated with adhesive and screwed into the female portion 24 of the lower cue half portion 26 with the flange 20 in abutment with the end of the portion 24 of the body portion 26. As a result the connector 16 is permanently secured in the lower cue body portion 26, and the two cue portions are completed as in FIGURE 9. The cue A is completed by screwing the threaded end portion 22 of the connector 16 into the threaded female portion 28 of the cue half portion 30 with the end of the bushing portion 28 and body portion 30 in abutment with flange 20 of connector 16, as illustrated in FIGURE 8. The joint of body portions 26 and 30 together with flange 20 of connector 16 is simultaneously sanded to produce a smooth joint.

The cue A is broken down into two pieces by simply unscrewing one half body portion from the other. The aforementioned construction can be employed in other tubular devices such as fishing rods as a further example of use.

The invention is not to be understood as restricted to the details set forth since these may be modified within the scope of the appended claims without departing from the spirit and scope of the invention.

Having thus described the invention what is claimed as new and desired to be secured by Letters Patent is:

1. The method of making a two-piece billiard cue consisting in forming a tubular body having a constant taper and constant wall thickness, then forming a bushing having a constant outside taper corresponding to the inside taper of said tubular body for a given length of the tubular body and having threads formed internally along a portion thereof and also centrally thereof, then inserting the bushing in the tubular body to the point where the bushing taper corresponds with the body taper to position the bushing in the tubular body, then simultaneously cutting the tubular body and bushing substantially centrally thereof to form upper and lower half cue portions, then forming a connector member having a centrally disposed circular flange with a threaded portion on the lower end thereof and a threaded portion on the upper end thereof, and then threadedly engaging the lower threaded end of the connector permanently in the lower half cue portion with the upper threaded end of the connector threadedly connected in the upper half cue portion, the inner ends of the cue portions in abutment with the circular flange.

2. The method of making a two-piece tubular member consisting in forming a tubular body, then forming a bushing having threads formed internally along at least a portion thereof and centrally thereof, then securing the bushing within the tubular body, then simultaneously cutting the tubular body and bushing substantially centrally thereof to form upper and lower half tubular portions, then forming a connector member having a centrally disposed circular flange with a threaded portion on the upper end thereof and a threaded portion on the lower end thereof, and then threadedly engaging the lower threaded end of the connector member permanently in the lower half tubular portion with the upper threaded end of the connector threadedly connected in the upper half tubular portion, the inner ends of the tubular portions in abutment with the circular flange of the bushing member.

References Cited
UNITED STATES PATENTS

| | | | |
|---|---|---|---|
| 1,280,876 | 10/1918 | Seenan | 273—68 |
| 1,505,609 | 8/1924 | Seaman et al. | 273—68 |
| 2,386,246 | 10/1945 | Mapes | 29—414 |

THOMAS H. EAGER, *Primary Examiner.*